(12) United States Patent
Schneider et al.

(10) Patent No.: US 9,862,087 B2
(45) Date of Patent: Jan. 9, 2018

(54) DEVICE FOR BLOCKING EYEGLASS LENSES

(75) Inventors: Gunter Schneider, Marburg (DE); Helwig Buchenauer, Dautphetal-Buchenau (DE); Ulf Börner, Marburg (DE); Klaus Krämer, Dautphetal-Friedensdorf (DE)

(73) Assignee: SCHNEIDER GMBH & CO. KG, Fronhausen (DE)

( * ) Notice: Subject to any disclaimer, the term of this patent is extended or adjusted under 35 U.S.C. 154(b) by 718 days.

(21) Appl. No.: 13/994,963

(22) PCT Filed: Dec. 20, 2011

(86) PCT No.: PCT/EP2011/073459
§ 371 (c)(1),
(2), (4) Date: Jun. 17, 2013

(87) PCT Pub. No.: WO2012/084988
PCT Pub. Date: Jun. 28, 2012

(65) Prior Publication Data
US 2013/0270759 A1 Oct. 17, 2013

(30) Foreign Application Priority Data

Dec. 22, 2010 (DE) .......................... 10 2010 055 502
Jan. 25, 2011 (DE) .......................... 10 2011 009 400

(51) Int. Cl.
*B25H 1/00* (2006.01)
*B24B 13/00* (2006.01)
(Continued)

(52) U.S. Cl.
CPC .......... *B25H 1/0021* (2013.01); *B24B 13/005* (2013.01); *B24B 13/0031* (2013.01); *B24B 41/005* (2013.01)

(58) Field of Classification Search
CPC .......... B24B 313/005; B24B 313/0052; B24B 313/0055; B24B 341/005; B24B 313/0031; B24B 313/0037; B25H 1/0021
See application file for complete search history.

(56) References Cited

U.S. PATENT DOCUMENTS 5,908,348 A * 6/1999 Gottschald ............ B24B 47/225
451/11
5,967,879 A 10/1999 Gottschald
(Continued)

FOREIGN PATENT DOCUMENTS

DE 44 14 784 A1 11/1995
DE 10 2004 021 696 A1 11/2005
(Continued)

*Primary Examiner* — Christopher M Koehler
*Assistant Examiner* — Joel Crandall
(74) *Attorney, Agent, or Firm* — Hudak, Shunk & Farine Co. LPA

(57) ABSTRACT

A device for blocking eyeglass lenses onto blocks using a bonding mass, by which the eyeglass lens is connected to the block in a form-fit and/or force-closed manner, having several stations, between which the eyeglass lens and/or the block is transported, at least one blocking station, in which the block is connected to the eyeglass lens using the bonding mass, a transport arm having a retaining head arranged thereon for positioning the eyeglass lens in the blocking station, wherein the transport arm is designed as a pivot arm and has at least one pivot axis (S1), by means of which the transport arm and the retaining head can be moved between at least two stations, and at least one conveying arm having a retainer for the block or an eyeglass lens, wherein the conveying arm has a pivot axis (S2), which is arranged parallel or coaxial to the pivot axis (S1) and by which the retainer can be moved between at least two stations.

19 Claims, 3 Drawing Sheets

(51) Int. Cl.
    *B24B 13/005*    (2006.01)
    *B24B 41/00*    (2006.01)

(56) References Cited

U.S. PATENT DOCUMENTS

2007/0236657 A1* 10/2007 Mazoyer ................. B24B 9/146
                                                     351/178
2010/0297919 A1* 11/2010 Freson et al. .................... 451/42
2011/0067628 A1*  3/2011 Savoie et al. ................. 118/500

FOREIGN PATENT DOCUMENTS

| DE | 10 2008 023 093 A1 |   | 11/2009 | | |
|---|---|---|---|---|---|
| EP |        0183324 A2 | * |  6/1986 | ........... | B29C 31/006 |
| EP |      1 839 810 A1 |   | 10/2007 | | |
| JP |    2001 259982 A  |   |  9/2001 | | |
| WO |    2009 010466 A1 |   |  1/2009 | | |

* cited by examiner

DEVICE FOR BLOCKING EYEGLASS LENSES

FIELD OF THE INVENTION

The invention pertains to a device for blocking eyeglass lenses or semifinished eyeglass lenses onto blocks making use of a bonding compound, by means of which the eyeglass lenses joined to the block in a form-fit or force-closed manner by a first finished or yet to be machined side, having several stations between which the eyeglass lens and/or the block is transported, at least one station that is laid out as a blocking station, in which the block is connected to the eyeglass lens by means of the bonding compound, a transport arm with a retainer head arranged thereon for the positioning of the eyeglass lens at least in the blocking station, the transport arm being configured as a pivot arm and having at least one pivot axis, by means of which the transport arm with the retaining head can move between at least two stations.

The invention likewise pertains to a method for blocking an eyeglass lens or semifinished eyeglass glass or to a block in which a first eyeglass lens is transferred from an eyeglass lens magazine to the transport arm, the first eyeglass lens is handed over from the transport arm to a first blocking station and then blocked onto the first block, being left in the blocking station for a cooldown time.

BACKGROUND OF THE INVENTION

A device is already known for the blocking of eyeglass lenses from DE 10 2008 023 093 A1. This has a measuring station for detecting the orientation and geometrical information for the workpiece being blocked, a blocking station in which the workpiece can be blocked onto a block by means of a temporarily deformable blocking material, and a transport mechanism having a retaining head for the workpiece, by means of which a relative motion can be produced between the workpiece retained on the retaining head, on the one hand, and the measuring station and blocking station, on the other. To enable the most universal possible use of the blocking device, the transport mechanism has a total of two translatory and three rotational movement axes (X, Z, A, B, C), by means of which the workpiece can be positioned relative to a block located in the blocking station, taking into account the orientation and geometrical information detected in the measuring station, and retained during the blocking process in the defined relative position to the block, leaving a gap between workpiece and block to accommodate the blocking material. In addition, a pivot arm is provided, by means of which the lens can be transported between magazine boxes and a vertical unit. Alternatively, the block can be handed off with the pivot arm to the blocking station, starting from a vertical.

A blocking station is known from DE 10 2004 021 696 A1 for at least one optical lens with at least one blocking device for placing a block on the optical lens, in which a coating unit for the lens, a detecting unit for detection of lens types and/or markings on the lens, and a transport unit for transport of the lenses between the coating unit, the detecting unit, and the blocking device are provided. The transport unit has five rotational movement axes.

SUMMARY OF THE INVENTION

The problem of the invention is to modify and arrange a device for the blocking of eyeglass lenses, as well as a method for this, so that the fastest and most precise cadencing of the blocking process is assured.

The problem is solved according to the invention in that at least one conveying arm having a retainer for the block or an eyeglass lens is provided, wherein the conveying arm has a pivot axis S2, which is arranged parallel or coaxial to the pivot axis S1 and by means of which the retainer can be moved between at least two stations. The conveying arm arranged so as to pivot coaxially to the transport arm and preferably able to transport the eyeglass lens or a block enables the simultaneous or synchronized loading or synchronized transport of different eyeglass lenses and/or blocks, so that on the whole an optimal timing frequency is assured for the blocking device working in this way. The retainer of the conveying arm is preferably configured as a suction cup, but at least so that it can retain both the block and an eyeglass lens or semifinished product. By configuring the transport and conveying arm as a pivot arm with pivot axis S1, S2, a favorable utilization of available space and therefore an advantageous size of the blocking mechanism as a whole is assured. The resulting cadencing and travel times can thus be optimized as well.

The problem is also solved by the aforementioned method, in which a second eyeglass lens is taken up by the transport arm during the cooldown time, being handed off via the transport arm to the second blocking station, and during this transport process and before the handing off of the respective eyeglass lens to the respective blocking station the conveying arm takes up a block from a block magazine and sets it down in the corresponding blocking station. Since cooldown times of several seconds are to be expected in a blocking method as used here, the cadencing time of the blocking device can be improved overall by the method of the invention because, on the one hand, the transport arm undertakes the transport of a second eyeglass lens during the blocking and cooldown process of the eyeglass lens and, on the other hand, the conveying arm fashioned at the same time as a pivot arm performs the transport of the blocks that need to be placed in the blocking station before the blocking process. The optical evaluation of the eyeglass lens preferably occurs during the transport or on the way to the blocking station. From the moment the preferably oriented eyeglass lens is taken up by the transport arm until it is set down in the blocking station, it is held constantly by the transport arm. Thus, knowledge of the position relative to the blocking station and thus the desired accuracy of the blocking process is assured. The retaining head of the transport arm preferably has two tilt axes K1, K2, by which the eyeglass lens can be tilted out from the transport plane into any desired position. While the pivoting transport arm is involved in the transport of the respective eyeglass lens, the transport of the blocks that need to be placed in the blocking station before the blocking process can be done by means of the conveying arm. These work sequences can therefore be synchronized and performed in the shortest of times.

Moreover, the problem is solved by a device for blocking of eyeglass lenses on blocks making use of a bonding compound, by which the eyeglass lens is joined to the block in form-fit and/or force-closed manner, having:
- at least one blocking station, in which the block is connected to the eyeglass lens using the bonding compound;
- at least one handover unit to pick up eyeglass lenses from an eyeglass lens magazine;
- a transport arm having a retaining head arranged thereon with two tilting axes K1, K2 for positioning the eyeglass lens in the blocking station, wherein the transport arm has at least one translatory axis T1, by means of which the transport arm and the retaining head can be moved relative to the blocking station, wherein the transport arm is designed as a pivot arm and has at least one pivot axis S1, by means of which the transport arm with the retaining head can be moved between the handover unit and the blocking station, and the retaining head has a translatory axis T2, by means of which the retaining head can be moved relative to the transport arm. This kind of axis combination ensures a fast and accurate cadencing of the blocking process.

It can also be advantageous for this if the transport arm has at least one translatory axis T1, by means of which the transport arm with the retaining head can be moved relative to the blocking station, and/or the retaining head has a translatory axis T2, by means of which the retaining head can be moved relative to the transport arm. The translatory axis T2 is preferably oriented radially to the pivot axis S1, so that the retaining head can be positioned at will in the range of an arc or circular ring-shaped sector. The translatory axis T2 in combination with the pivot axis S1 and the two tilt axes K1 and K2 makes sure that the eyeglass lens can be positioned at will in the blocking station.

Moreover, it can be advantageous for the retainer to have a translatory axis T3 by means of which the retainer can be moved relative to the conveying arm with at least one directional component parallel to the pivot axis S2. Since the pivot movement of the transport arm about the pivot axis S1 and the pivot movement of the conveying arm about the axis S2 can occur independently of each other, the translatory axis T3 ensures that the transport arm is also independent in its lifting and lowering movements from the lifting and lowering movement of the conveying arm and the translatory axis T1. In this case, the translatory axis T3 has at least one directional component parallel to the pivot axis S2.

It can also be advantageous for one station to be configured as an orienting station, having an abutment element against which the eyeglass lens or semifinished product can be placed for orienting the relative position between the eyeglass lens and the retaining head. In order to assure a more precise blocking process, it is necessary to define the orientation and position of the eyeglass lens being blocked relative to the transport arm. Since the eyeglass lens is generally brought up in a transport box by means of a conveyor belt, in which a precise position cannot be assured, the orienting station with the abutment element is provided as a further modification of the invention in order to assure a defined position of the eyeglass lens relative to the abutment element and thus relative to the retaining head. The placing of the eyeglass lens against the abutment element is preferably done by a handover unit, with which the blocking device or the transport arm is supplied from the eyeglass lens magazine.

It can be provided advantageously that the orienting station has a translatory axis T4, by means of which the abutment element can be moved relative to the transport arm. Since the eyeglass lens for purposes of placement against the abutment element is put in place from below via the orienting station or its retaining part and the retaining head is brought up to the eyeglass lens from above during the handover to the transport arm, the abutment element of the orienting station finds itself so to speak between the retaining head and the eyeglass lens. Now, in order for the retaining arm to pivot, it is necessary to move the abutment element away. This is done preferably via the translatory axis T4, so that the transport arm with the retaining head can be pivoted about the pivot axis S1 and travel to the respective blocking station.

It can be of special importance to the present invention if the abutment element has two abutment spikes, which can be brought between the retaining head and an eyeglass lens attached to it. The abutment spikes ensure the use of a retaining head with three retaining pins that are distributed about the circumference and grasp the eyeglass lens in the radial direction. Since the abutment element or the abutment spikes are accommodated in sandwich manner between the retaining head and the eyeglass lens, the space available in the gaps between the three retaining pins of the retaining head is utilized favorably by the use of retaining spikes.

In connection with the configuration and arrangement of the invention it can be advantageous to provide one handover unit and one eyeglass lens magazine, wherein the handover unit serves to pick up from the eyeglass lens magazine and hand off to the eyeglass lens magazine and the handover unit has: a) a first pivot axis S3, by means of which the eyeglass lens can be moved between the eyeglass lens magazine and the orienting station or the transport arm, b) a second pivot axis S4, by which the pivot arm and thus the eyeglass lens attached to it can be brought into an upside down position. The semifinished product or eyeglass lens will generally lie with the concave side, yet to be machined, pointing downward in the transport box, so that on the one hand the position is stable and on the other hand the convex, already fully machined side is not damaged by the transport process. For purposes of handover to the transport arm and abutment against the abutment element of the orienting station, it is necessary to turn the eyeglass lens supported at the convex side (upside-down), so that the concave and former support side is oriented upward and thus can be placed against the abutment element from below. This is ensured by the pivot axis S4. The pivot axis S3, finally, ensures the handover process from the transport box on the conveyor belt to the blocking device. Moreover, the handover unit has a second translatory axis T5, which assures the lifting and lowering movement of the handover unit.

Moreover, it can be advantageous for one station to be configured as a turning station with an axis of rotation D1, by means of which the block with the blocked-on eyeglass lens can be turned at least partly about a center axis of the block. The relative position between the respective eyeglass lens and the block being placed thereon is dictated in the respective blocking station. The aforementioned turning station is provided in order to assure a given orientation dictated by the transport box after the blocked-on eyeglass lens is received. This orients the eyeglass lens with the block in the direction of rotation in relation to the center axis of the block so that the block can be set down in the proper orientation in the transport box after it is handed over by means of the handover unit with the accompanying pivot movement. The turning station is located in the action range of at least the conveying arm and the handover unit.

Furthermore, it can be advantageous when at least two or three blocking stations are provided, each of which can be accessed via the transport arm and the conveying arm, and/or when one station is configured as a block magazine which can be accessed via the conveying arm. When three blocking stations are used, even with rather lengthy cooldown times of more than 30 seconds one can achieve overall an optimal cadence for the blocking device. The three blocking stations can be supplied both with blocks from the block magazine and with eyeglass lenses via the transport arm and the conveying arm, so that an optimal work stroke overall is assured in terms of the handover and pick-up cadence. A further automating of the blocking process is assured with an integrated block magazine.

Furthermore, it can be advantageous when a dispensing unit for bonding compound is provided, having an axis of movement B1, by means of which the dispensing unit can be positioned in at least two positions P1, P2, P3 in the area of the particular blocking station. Depending on the cadences of the various blocking stations, these can be supplied with bonding compound via the movable dispensing unit, so that one can also satisfy the temperature conditions of the bonding compound. It can be advantageous for the method of the invention when the conveying arm after the cooldown time removes the blocked-on eyeglass lens with a block from the particular blocking station and delivers it to the handover unit or the turning station. Since the conveying arm can transport both a block and an eyeglass lens with attached block, the unloading process of the particular blocking station by the conveying arm can also be synchronized with the transport of the eyeglass lenses being blocked by the transport arm. The blocks have a closed surface which, like the eyeglass lenses, can be secured and held in particular by a suction cup of the conveying arm.

Furthermore, it can be advantageous when the eyeglass lens is brought to bear against the abutment element by means of the handover unit or by means of the transport arm for the purpose of orienting the relative position to the conveying arm. As already described above, the orienting of the eyeglass lens on the abutment element ensures a defined relative position of the eyeglass lens for the further blocking process. Preferably the bearing against the abutment element occurs from below, so that the conveying arm can grasp the oriented eyeglass lens from above.

Finally, it can be advantageous when the retaining force of the handover unit or the transport arm is reduced as it is placed against the abutment element, so that a relative movement of the eyeglass lens relative to the handover unit or relative to a retaining part of the handover unit is made possible. For purposes of reducing the retaining force of the handover unit, preferably the retaining force of a retaining cup of the handover unit will be reduced or set at zero or close to zero, so that a relative movement between the eyeglass lens and the handover unit or the holding cup is easily possible. Alternatively, it would also be possible to configure the retaining cup or a similar retaining element to be so flexible that the orienting movement of the eyeglass lens relative to the abutment element occurs under simultaneous elastic deformation of the retaining part, so that the eyeglass lens can ultimately be oriented to the abutment element.

BRIEF DESCRIPTION OF THE DRAWINGS

Further benefits and details of the invention are explained in the patent claims and in the specification and represented in the figures. There are shown:

DETAILED DESCRIPTION OF THE INVENTION

Figure 1:
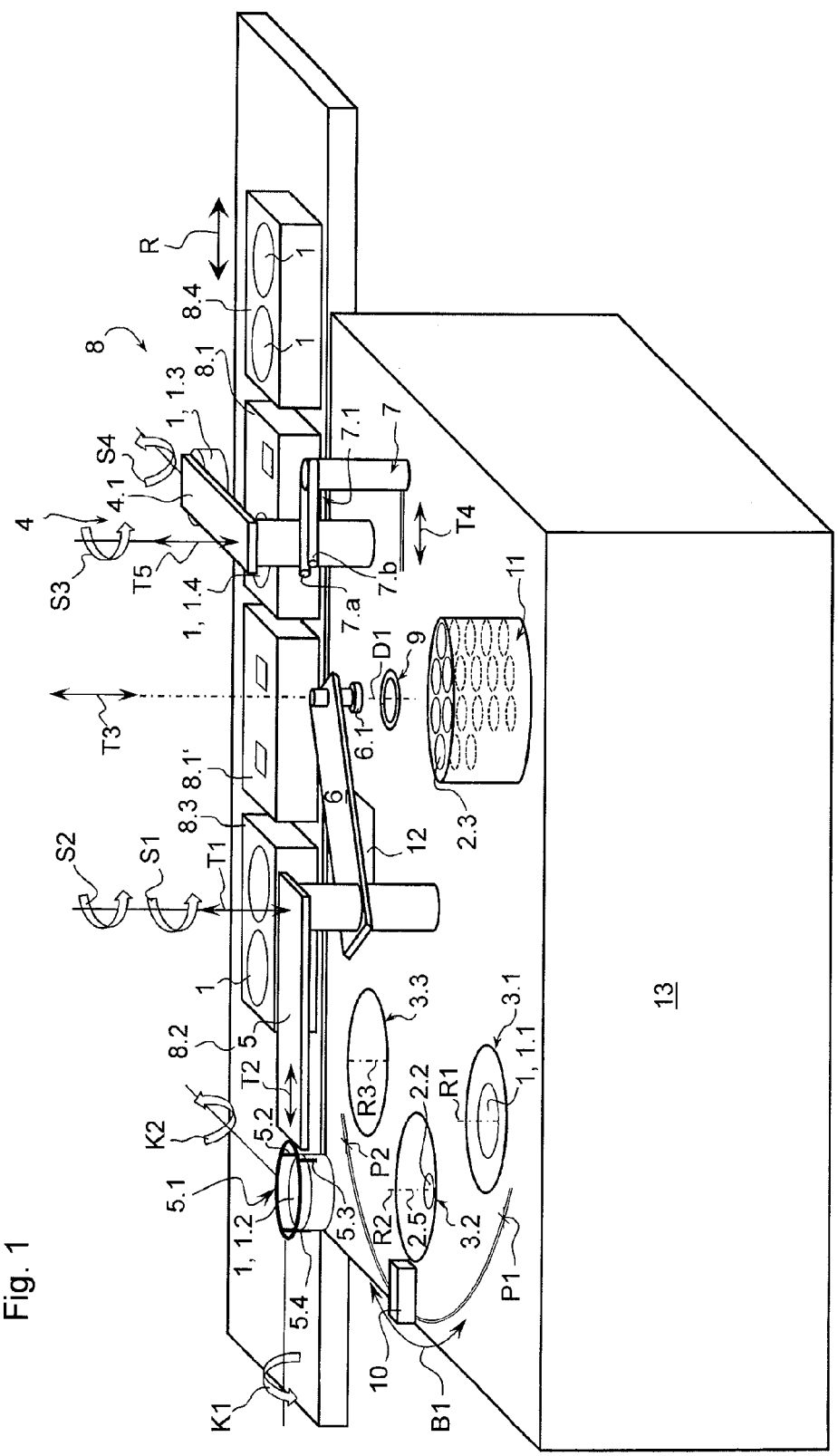
FIGS. 1 to 3, a schematic of the blocking device according to the invention in different states of processing.

A blocking device shown schematically according to FIG. 1 has a machine frame 13, which has a conveyor belt 8.2 for transport boxes 8.1, 8.1', 8.3, 8.4 for eyeglass lenses 1 or semifinished products bordering on its rear side.

By means of a handover unit 4, eyeglass lenses 1 are received from the respective transport box 8.1. The handover unit 4 is configured as a pivot arm and has one pivot axis S3, one translatory axis T5 and a second pivot axis S4 for turning the eyeglass lens 1.3 into an upside-down position. Roughly in the middle of the machine frame 13 there is placed a transport arm 5, which is likewise configured as a pivot arm with a pivot axis S1. Furthermore, the transport arm 5 has a first translatory axis T1 as well as a translatory axis T2 running in the radial direction to the pivot axis S1. In addition to the transport arm 5, a conveying arm 6 is provided, which is likewise configured as a pivot arm. The conveying arm 6 has a pivot axis S2 disposed coaxially to the pivot axis S1. At the head end of the conveying arm 6 the latter has a translatory axis T3 which ensures at least one motion component parallel to the pivot axis S2. Likewise, the translatory axis T1 has one motion component parallel to the pivot axis S1. The transport arm 5 and the conveying arm 6 can swivel simultaneously and independently of each other about the pivot axis S1, S2.

Figure 2:
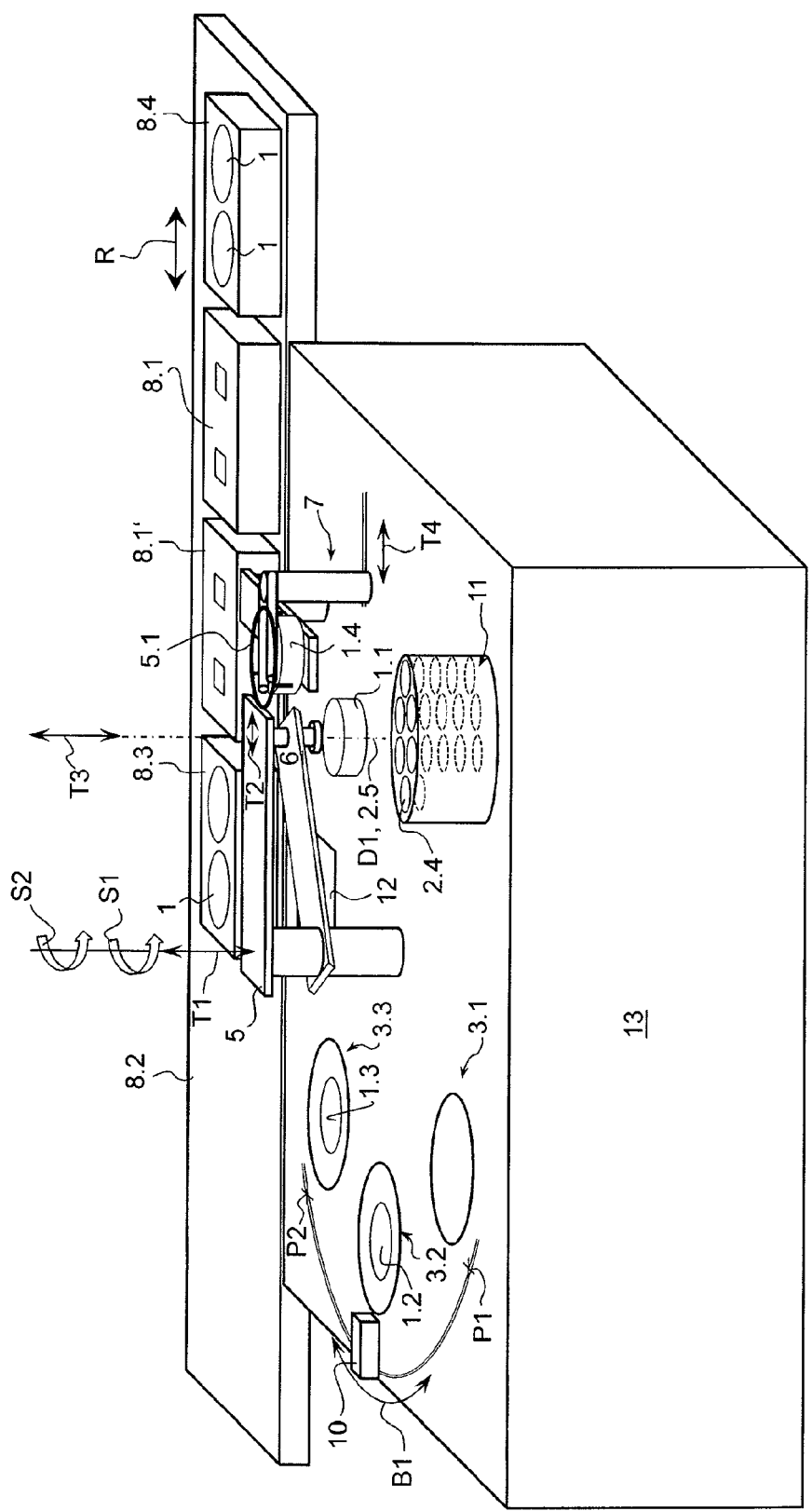

In the swivel range of the transport arm 5 and the conveying arm 6, three blocking stations 3.1, 3.2, 3.3 are arranged in a semicircle on the machine frame 13 according to the swivel radius of the transport arm 5 and the conveying arm 6. In the further course of this semicircular arrangement situated in the swivel radius, the machine frame 13 has an optical evaluating unit 12, a turning station 9, an orienting station 7, and adjoining the latter in the circular direction a block magazine 11. The handover unit 4 or its pivot arm 4.1 is located, as shown by FIG. 2, in the inwardly swiveled position likewise in the action radius of the transport and conveying arm 5, 6.

According to FIG. 1, the first eyeglass lens 1.1 is situated in the first blocking station 3.1, being positioned above a block (not shown) for purposes of being connected to it.

The transport arm 5 has a retaining head 5.1, which is arranged on the transport arm 5 so that it can move about two tilt axes K1, K2 arranged at right angles to each other relative to the transport arm 5. Furthermore, the retaining head 5.1 can move via a translatory axis T2 in the radial direction to the pivot axis S1 relative to the transport arm 5. In this way, every station on the blocking device and every relative position to the blocking station 3.1-3-3 can be reached. The orienting between the block 2.1-2.4 and the eyeglass lens 1.1-1.4 in relation to the center axis 2.5 of the block occurs by means of a rotation axis R1-R3 of the particular blocking station. By means of the tilt axes K1, K2 and the translatory axis T2, the eyeglass lens 1 or the eyeglass lens can be oriented at will with respect to the horizontal and thus be positioned in any given position relative to a block 2.2. The mechanical transmission of the tilt axes K1, K2 can be chosen at will. Ultimately one must select a drive unit with several motion axes, such that each motion axis ensures at least one motion component about at least one of the tilt axes K1, K2.

Above the second blocking station 3.2, an eyeglass lens 1.2 is positioned by means of the retaining head 5.1, having been taken out of the orienting station 7 by the transport arm 5 and transported to the second blocking station 3.2. The block 2.2 has been set down within the second blocking station 3.2, having been removed from the block magazine 11 during the aforementioned transport process and having been set down there previously by means of the translatory axis T3. the third blocking station 3.3 is unoccupied at present. An eyeglass lens 1.3 intended for it is located in the handover unit 4. The pivot arm 4.1 has already lifted up the eyeglass lens 1.3 via its translatory axis T5. By swiveling about the pivot axis S3, this is brought into the range of the transport arm 5 per FIG. 2 and transported by the latter. During this process, either the first eyeglass lens 1.1 can be removed from the first blocking station 3.1 by means of the conveying arm 6 or the third blocking station 3.3 can be filled with a block 2.3. Moreover, the orienting station 7 with an abutment element 7.1 is provided on the machine frame 13, consisting of two abutment spikes 7a, 7b. The abutment element 7.1 serves to orient the eyeglass lens 1.1 relative to the transport arm 5, as explained below by means of FIG. 2.

According to FIG. 2, the blocking station 3.3 has in the meantime been filled with an eyeglass lens 1.3 and the eyeglass lens 1.3 has been blocked onto the block 2.3. A fourth eyeglass lens 1.4 from the transport box 8.1 is located in the handover unit 4 in the range of the transport arm 5. By means of the pivot axis S4 of the pivot arm 4.1, the eyeglass lens 1.4 has been swiveled into an upside-down position in relation to the position in the transport box 8.1. By means of the pivot arm 4.1, the eyeglass lens 1.4 in this upside-down position is placed from below against the two abutment spikes 7a, 7b of the orienting station 7. For this, the orienting station 7 travels via its translatory axis T4 per FIG. 2 to the left, into the range of the action radius of the transport arm 5. In order to ensure the orienting of the eyeglass lens 1.4 on the two abutment spikes 7a, 7b, the retaining force of the pivot arm 4.1 or a not further illustrated retaining part such as a suction cup, for example, is loosened or reduced at least briefly, so that an orienting of the eyeglass lens 1.4 on the two abutment spikes 7a, 7b is assured without elastic deformation of the retaining part or without excessive deformation. Once this orienting has been done, the eyeglass lens 1.1 is grasped by means of the retaining head 5.1 of the transport arm 5. For this, the retaining head 5.1 has three retaining pins 5.2, 5.3, 5.4, which apply tension to the eyeglass lens 1.4 in the radial direction. The eyeglass lens 1.1 is held by the retaining head 5.1 for the entire transport process, even in the evaluating unit. A loosening occurs only in the blocking station 3.1, 3.2. In order for the transport arm 5 to swivel now about its pivot axis S1 in the direction of a blocking station 3.1, 3.3, the orienting station 7 moves away to the right via its translatory axis T4 and releases the retaining head 5.1 with regard to the pivot motion per FIG. 3.

The two abutment spikes 7a, 7b are thus accommodated in the manner of a sandwich between the eyeglass lens 1 and the retaining head 5.1 after the retaining head 5.1 has come up to the now oriented eyeglass lens 1. Depending on the orientation of the retaining head 5.1, one of the retaining pins 5.2 is situated between the two abutment spikes 7a, 7b, so that the above-described travel of the abutment spikes 7a, 7b or the orienting station 7 in the direction of the translatory axis T4 is advantageous for purposes of the swiveling of the transport arm 5. The orienting or placement of the retaining pins depends on the existing space conditions. In particular, one should consider the use of a retaining part for the blocked-on eyeglass lens.

According to FIG. 2, the first blocked-on eyeglass lens 1.1 including block (not shown) has already been set down by means of the conveying arm 6 in the turning station 9, where its position is oriented in relation to a center axis 2.5 of a block 2.1 for purposes of handover to the transport box 8.1.

The block magazine 11 has accordingly been decreased by three blocks 2.1, 2.2, 2.3, namely, the eyeglass lens 1.1 in the turning station, the eyeglass lens 1.2 in the blocking station 3.2 and the eyeglass lens 1.3 in the blocking station 3.3.

Figure 3:
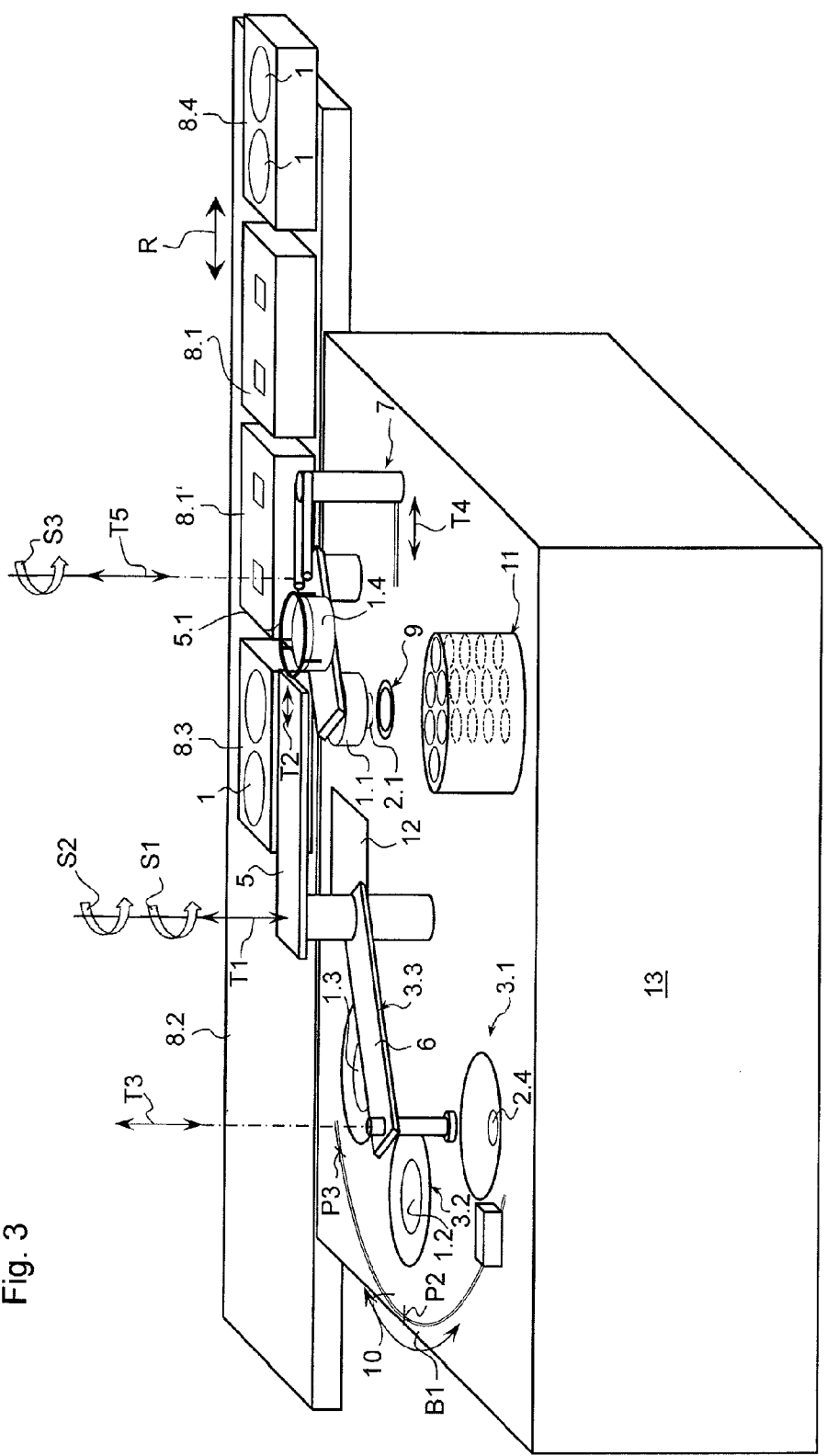

According to FIG. 3, another block 2.4 from the block magazine 11 has been set down in the blocking station 3.1. The setting down occurs via the translatory axis T3 of the conveying arm 6. The eyeglass lens 1.1 with the secured block 2.1 located in the turning station 9 is now picked up by means of the handover unit 4 or the pivot arm 4.1 making use of the translatory axis T5 and removed from the turning station 9. After this, the pivot arm 4.1 is swiveled about its pivot axis S3 and the blocked-on eyeglass lens 1.1 is set down in the transport box 8.1 with appropriate orientation in the circumferential direction, making use of the translatory axis T5. At the same time, the eyeglass lens 1.4 located in the retaining head 5.1 is passed off by the transport arm 5 to the blocking station 3.1, where it is joined to the block 2.4 located there. In order to prepare the necessary bonding compound, a dispensing unit 10 travels in the direction of its movement axis B1, which is situated on the machine frame 13 in the shape of a semicircle, corresponding to the arrangement of the blocking stations 3.1 to 3.3. The dispensing unit 10 can be positioned by means of its movement axis B1 in at least three positions P1, P2, P3 at the respective blocking station 3.1, 3.2, 3.3. After delivering bonding compound per FIG. 1 at blocking station 3.2, it can travel in sequence in position P3 to blocking station 3.3 and per FIG. 3 in position P1 to blocking station 3.1. The respective eyeglass lens is held by a retaining part after being positioned on the dispensed bonding compound or the block ring until the bonding compound is sufficiently firm.

After the respective eyeglass lens 1.1 to 1.4 has been picked up by means of the transport arm 5 or the retaining head 5.1, the respective eyeglass lens 1 located on the transport arm 5 is read for optical information at the evaluating unit 12, before it is taken via the transport arm 5 to the particular blocking station 3.1 to 3.2. The above described transport processes of the transport arm 5, the conveying arm 6 and the handover unit 4 occur—as much as possible—at the same time, so that on the whole a maximum cadencing is achieved.

The block magazine 11 will be a stack magazine, indicated by the blocks shown in broken line, which are taken out stackwise or in the circumferential direction by means of the conveying arm 6.

The transport boxes 8.1, 8.1' are moved or timed via a conveyor belt 8.2 as needed in the transport direction R, depending on the eyeglass lens 1.1 being picked up or set down.

LIST OF REFERENCE SYMBOLS 1. eyeglass lens, semifinished product, semifinished eyeglass lens
1.1 eyeglass lens, semifinished product, semifinished eyeglass lens
1.2 eyeglass lens, semifinished product, semifinished eyeglass lens
1.3 eyeglass lens, semifinished product, semifinished eyeglass lens
1.4 eyeglass lens, semifinished product, semifinished eyeglass lens
2.1 block
2.2 block
2.3 block
2.4 block
2.5 center axis
3.1 blocking station, station
3.2 blocking station, station
3.3 blocking station, station 4 handover unit
4.1 pivot arm
5 transport arm
5.1 retaining head
5.2 retaining pin
5.3 retaining pin
5.4 retaining pin
6 conveying arm
6.1 retainer
7 orienting station, station
7.1 abutment element
7a abutment spike
7b abutment spike
8 eyeglass lens magazine, semifinished product magazine
8.1 transport box
8.1' transport box
8.2 conveyor belt
8.3 transport box
8.4 transport box
9 turning station, station
10 dispensing unit
11 block magazine, station
12 evaluation unit, station
13 machine frame
B1 axis of movement
D1 axis of rotation
P1 position
P2 position
P3 position
K1 tilt axis
K2 tilt axis
R transport direction
R1 rotation axis of blocking station
R2 rotation axis of blocking station
R3 rotation axis of blocking station
S1 pivot axis
S2 pivot axis
S3 first pivot axis
S4 second pivot axis
T1 translatory axis
T2 translatory axis
T3 translatory axis
T4 translatory axis
T5 translatory axis

What is claimed is:

1. A device for blocking eyeglass lenses onto blocks using a bonding mass, by which the eyeglass lens is connected to the block in one or more of a form-fit and a force-closed manner, comprising:
   a) several stations, between which one or more of the eyeglass lens and the block is transported;
   b) wherein the several stations include at least one blocking station, in which the block is connected to the eyeglass lens using the bonding mass;
   c) a transport arm having a retaining head arranged thereon for positioning the eyeglass lens in at least the blocking station, wherein the transport arm is designed as a pivot arm and has at least one transport arm pivot axis (S1), by which the transport arm and the retaining head can be moved between at least two stations, wherein at least one conveying arm having a retainer for the block or an eyeglass lens is provided, wherein the conveying arm has a conveying arm pivot axis (S2), which is arranged coaxial to the transport arm pivot axis (S1) and by which the retainer can be moved between at least two stations, wherein at least one of the at least one blocking station(s) is stationary, wherein the conveying arm is pivotable around the conveying arm pivot axis (S2) independent of the transport arm pivotability around the transport arm pivot axis (S1).

2. The blocking device according to claim 1, wherein one or more of a) the transport arm has at least one transport arm translatory axis (T1), by which the transport arm with the retaining head can be moved relative to the blocking station, and b) the retaining head has a retaining head translatory axis (T2), by which the retaining head can be moved relative to the transport arm.

3. The blocking device according to claim 2, wherein the retainer has a retainer translatory axis (T3) by which the retainer can be moved relative to the conveying arm in a direction parallel to the conveying arm pivot axis (S2), and wherein one station is configured as an orienting station, having an abutment element against which the eyeglass lens can be placed for orienting a relative position between the eyeglass lens and the retaining head.

4. The blocking device according to claim 3, wherein the orienting station has an orienting station translatory axis (T4), by which the abutment element can be moved relative to the transport arm, wherein the abutment element has two abutment spikes, which can be brought between the retaining head and an eyeglass lens attached to it, wherein one handover unit and one eyeglass lens magazine are provided, wherein the handover unit serves to pick up from the eyeglass lens magazine and hand off to the eyeglass lens magazine and the handover unit has: a) a first pivot axis (S3), by means of which the eyeglass lens can be moved between the eyeglass lens magazine and the orienting station or the transport arm, b) a second pivot axis (S4), by which the eyeglass lens can be brought into an upside down position.

5. The blocking device according to claim 4, wherein one station is configured as a turning station with an axis of rotation (D1), by which the block with the blocked-on eyeglass lens can be turned about a center axis of the block, wherein one or more of a) at least two or three blocking stations are provided, each of which can be accessed via the transport arm and the conveying arm, and b) one station is configured as a block magazine which can be accessed at least via the conveying arm, and wherein a dispensing unit for bonding compound is provided, having an axis of movement (B1), by which the dispensing unit can be positioned in at least two different positions (P1), (P2), (P3) in the area of the particular blocking station.

6. The blocking device according to claim 1, wherein the retainer has a retainer translatory axis (T3) by which the retainer can be moved relative to the conveying arm in a direction parallel to the conveying arm pivot axis (S2).

7. The blocking device according to claim 1, wherein one station is configured as an orienting station, having an abutment element against which the eyeglass lens can be placed for orienting a relative position between the eyeglass lens and the retaining head.

8. The blocking device according to claim 7, wherein the orienting station has an orienting station translatory axis (T4), by which the abutment element can be moved relative to the transport arm.

9. The blocking device according to claim 7, wherein the abutment element has two abutment spikes, which can be brought between the retaining head and an eyeglass lens attached to it.

10. The blocking device according to claim 1, wherein one handover unit and one eyeglass lens magazine are provided, wherein the handover unit serves to pick up from the eyeglass lens magazine and hand off to the eyeglass lens magazine and the handover unit has:

a) a first pivot axis (S3), by means of which the eyeglass lens can be moved between the eyeglass lens magazine and the orienting station or the transport arm, b) a second pivot axis (S4), by which the eyeglass lens can be brought into an upside down position.

11. The blocking device according to claim 1, wherein one station is configured as a turning station with an axis of rotation (D1), by which the block with the blocked-on eyeglass lens can be turned about a center axis of the block.

12. The blocking device according to claim 1, wherein one or more of a) at least two or three blocking stations are provided, each of which can be accessed via the transport arm and the conveying arm, and b) one station is configured as a block magazine which can be accessed at least via the conveying arm.

13. The blocking device according to claim 1, wherein a dispensing unit for bonding compound is provided, having an axis of movement (B1), by which the dispensing unit can be positioned in at least two different positions (P1), (P2), (P3) in the area of the blocking station.

14. A method for blocking an eyeglass lens on a first block, comprising the steps of:
   a) picking a first eyeglass lens up by a transport arm,
   b) handing the first eyeglass lens by the transport arm to a first blocking station, wherein the first blocking station is stationary,
   c) blocking the first eyeglass lens onto the first block and leaving for a cooldown time in the first blocking station,
   d) during the cooldown time, passing a second eyeglass lens to the transport arm by a handover unit, being transported via the transport arm to a second blocking station and setting it down in the second blocking station, wherein the second blocking station is stationary,
   e) during this transport process and before the respective eyeglass lens is set down at the respective blocking station, the conveying arm removes a block from a block magazine and sets it down in the corresponding blocking station, and
   f) wherein the transport arm is designed as a pivot arm and has at least one transport arm pivot axis (S1) by which the transport arm is moved between at least two stations, wherein the conveying arm has a conveying arm pivot axis (S2) which is arranged coaxially to the transport arm pivot axis (S1) by which a retainer of the conveying arm is moved between at least two stations.

15. The method according to claim 14, wherein the conveying arm after the cooldown time removes the blocked-on eyeglass lens with a block from the particular blocking station and delivers it to the handover unit or a turning station.

16. The method according to claim 15, wherein the eyeglass lens is brought to bear against the abutment element by the handover unit or by the transport arm for the purpose of orienting the relative position to the conveying arm.

17. The method according to claim 16, wherein a retaining force of the handover unit or the transport arm is reduced as it is placed against the abutment element, so that a relative movement of the eyeglass lens relative to the handover unit is made possible.

18. The method according to one of claim 14, wherein the eyeglass lens is brought to bear against an abutment element by the handover unit or by the transport arm for the purpose of orienting the relative position to the conveying arm.

19. The method according to claim 18, wherein a retaining force of the handover unit or the transport arm is reduced as it is placed against the abutment element, so that a relative movement of the eyeglass lens relative to the handover unit is made possible.

* * * * *